United States Patent [19]

Maegawa

[11] 4,398,725
[45] Aug. 16, 1983

[54] ROTARY SHAFT WATER SEAL DEVICE IN HYDRAULIC MACHINE

[75] Inventor: Muneo Maegawa, Hitachi, Japan
[73] Assignee: Hitachi, Ltd., Tokyo, Japan
[21] Appl. No.: 435,627
[22] Filed: Oct. 20, 1982
[51] Int. Cl.³ .............................................. F16J 15/26
[52] U.S. Cl. ................................... 277/192; 277/148; 277/155; 277/199
[58] Field of Search ................ 277/148, 154, 155, 192, 277/195, 198, 199

[56] References Cited

U.S. PATENT DOCUMENTS

| | | | |
|---|---|---|---|
| 121,897 | 12/1871 | Richards | 277/155 X |
| 892,978 | 7/1908 | Carter | 277/199 X |
| 3,276,781 | 10/1966 | Blank | 277/148 X |
| 3,738,669 | 6/1973 | Andersen et al. | 277/199 |

FOREIGN PATENT DOCUMENTS 53-3021 2/1978 Japan .
54-53742 4/1979 Japan .
34975 6/1913 Sweden .............................. 277/155

Primary Examiner—Robert S. Ward, Jr.
Attorney, Agent, or Firm—Thomas E. Beall, Jr.

[57] ABSTRACT

A rotary shaft seal device in a hydraulic machine. With the water seal segments in the conventional water seal device, a gap tends to be generated between the inner peripheral surface of the segment packing and the outer peripheral surface of a liner of the rotary shaft due to the wear during use and progressively developed. The present invention contemplates to minimize the gaps between the adjacent segments and guide members interposed between the adjacent segments are solidly secured, whereby the flow rate of water leakage through the segments is reduced and the segments themselves are improved in mechanical strength, so that the segments can be reduced in size and the water seal device itself can be rendered compact in size.

2 Claims, 7 Drawing Figures

ROTARY SHAFT WATER SEAL DEVICE IN HYDRAULIC MACHINE

BACKGROUND OF THE INVENTION

This invention relates to a water seal device for a rotary shaft in a hydraulic machine, such as a water seal device for a rotary shaft suitable for use in a large-sized hydraulic machine, for example, a turbine for a hydraulic power plant, and more particularly to a shaft seal to seal water on the outer peripheral surface of a rotary shaft by solid packing.

FIG. 1 shows the hydraulic power plant in common use. The power plant of this type comprises: a runner 1 to convert a potential energy of water into a kinetic energy; a generator to convert the kinetic energy of the runner into an electric energy; a main shaft 3 connecting the runner to the generator; a casing 4 to uniformly introduce water, which has passed through a hydraulic steel piping from an upper reservoir, to the entire periphery of the runner; guide vanes 5 to adjust a flow rate of the water thus introduced; an upper and lower covers 6 and 7 to cover the top and bottom of the runner; a draft pipe 8 and a tube 9 for leading the water, which has left the runner to a lower reservoir. In the power plant of the type described, in order to prevent water under pressure in a housing chamber of the runner to be blown out along the outer periphery of the main shaft 3, there is provided a rotary shaft water seal device 10 around the main shaft 3 in the upper cover 6.

FIGS. 2 through 5 show the conventional rotary shaft water seal device of the type described. This device includes two carbon packings 12, 13 and a resin packing 14, each of which consists of a plurality of circular arcuate segments (all of which are solid packings), and these solid packings are received in an arrangement of three stages in an annular packing box solidly secures to the upper cover 6 at the outer periphery of a liner 3A of the main shaft 3. The packing box 11 is provided therein with support surface portions 11A, 11B and 11C which are disposed in three stages in the vertical direction, respectively. The resin packing 14 is mounted on the lower support surface portion 11A, one of the carbon packings 13 on the middle stage support surface portion 11B, and the other of the carbon packings 12 on the upper support surface portion 11C, respectively. The upper surface of the carbon packing 12 is blocked by a cover portion 11D of the packing box 11.

The inner peripheral surfaces of the solid packings 12, 13 and 14 are in sliding contact with the outer peripheral surfaces of the liner 3A of the main shaft 3 and pressed against the liner 3A of the main shaft 3 by a spring 15 wound around the outer periphery of the respective packings.

Description will now be given of the arrangement of the solid packing in conjunction with an example of the carbon packing 12 mounted on the upper stage. This packing is of such an arrangement in which a plurality of circular arcuate segments 12A are annularly arranged with a slight gap G being held between the adjacent segments. The segments 12A is each provided in a guide groove 17 formed at an intermediate portion between the adjacent segments 12A with a guide member 16 to guide the segment to be displaced in the radial direction of the rotary shaft and prevent the segment to be displaced in the circumferential direction. Each of the guide members 16 is solidly secured to the support surface 11C of the packing box by means of a set-screw.

Description will now be given of the reasons for adopting such a construction that the aforesaid gap G is taken and the segments are permitted to be displaced in the circumferential direction. The inner peripheral surfaces of the segments 12A are worn due to sliding contact with the liner 3A of the main shaft 3. Assumption is made that the segments are solidly secured to one another in an annular state with the adjacent segments being abutted against each other. Due to the wear on the inner peripheral surfaces the segments, a gap is generated between the inner peripheral surface of the packing and the outer peripheral surface of the liner and progressively developed. In order to prevent the development of this gap, the packing should be decreased in diameter, following the extent of wear. The above-described arrangement has been adopted to secure this decrease in diameter of the packing.

SUMMARY OF THE INVENTION

However, the conventional rotary shaft water seal device as described above presents the disadvantage that the flow rate of water leakage through the aforesaid gaps G is decreased from the following reasons.

The guide member to permit the segment to be displaced only in the circumferential direction is solidly secured to the packing box through the setscrew. However, because the center alignment is difficult to effect in a threading work, an error tends to occur in installing the guide member into the box. To absorb the error, a slight clearance is set on the sliding surfaces of the guide member and the guide groove. Due to the presence of this clearance, the values of displacement of the segments in the circumferential direction are increased to reach ±0.5 to 1.0 mm. When these values of displacement of the segments in the circumferential direction are large, there occurs a possibility of damages at the end portions of the adjacent segments due to the abutment against each other. In order to eliminate this possibility, it becomes necessary to set a sizable gap G between the segments. This gap G has heretofore been determined to from appox. 2 to 5 mm. The flow rate of water leakage through the gaps G should necessarily be increased with the increase in the size of the gap G.

Here, the following is the total flow rate Q in the rotary shaft water seal device with the abovedescribed arrangement in an equation.

$$Q = Q_1 + Q_2 \qquad (1)$$
$$= k_1 \times A \times \sqrt{P_0} + k_2 \times B \times P_0$$

where $Q_1$ is the flow rate through the gaps G, $Q_2$ a flow rate of water leakage through the sliding surfaces of the packing and the shaft liner, A an area of the water leaking portions of the gaps G, $k_1$ and $k_2$ constants of proportionality, B dimension values of the sliding surfaces, and $P_0$ is a back pressure led and applied to the rear surface of the segment.

The flow rate of water leakage $Q_1$ is proportional to the area A of the water leaking portions of the gaps and the square root of the back pressure $P_0$, and hence, the flow rate of water leakage $Q_1$ is increased with the increase in the dimensions of the gaps.

In addition, the flow rate of water leakage $Q_2$ is proportional to the dimension values of the sliding surfaces B and the back pressure $P_0$, and hence, the ratio between $Q_1$ and $Q_2$ is different due to the back pressure. However, it is 1:2 under the normal water pressure during use.

The present invention has as its object the provision of a rotary shaft water seal device in a hydraulic machine, capable of controlling the flow rate of water leakage through the gaps.

According to the present invention, the guide members to guide the packing segments to be displaced in the radial direction are solidly secured to the packing box, whereby the installation error is reduced to a value as small as possible, so that the gap G can be controlled by a value as small as possible.

BRIEF DESCRIPTION OF THE DRAWINGS

FIGS. 2 through 5 show the examples of the prior art, in which

FIG. 2 is a plan view illustrating the state where the packing box is omitted,

FIG. 3 is a partially enlarged sectional view taken along the line III—III in FIG. 2, FIG. 4 is a partially enlarged sectional view taken along the line IV—IV in FIG. 2, and FIG. 5 is a sectional view taken along the line V—V in FIG. 4; and FIGS. 6 and 7 show one embodiment of the present invention, in which FIG. 6 is an enlarged, sectional plan view of the essential poritons and FIG. 7 is a view in the direction indicated by the arrows from line VII—VII in FIG. 6.

DESCRIPTION OF THE PREFERRED EMBODIMENT

Figure 1:
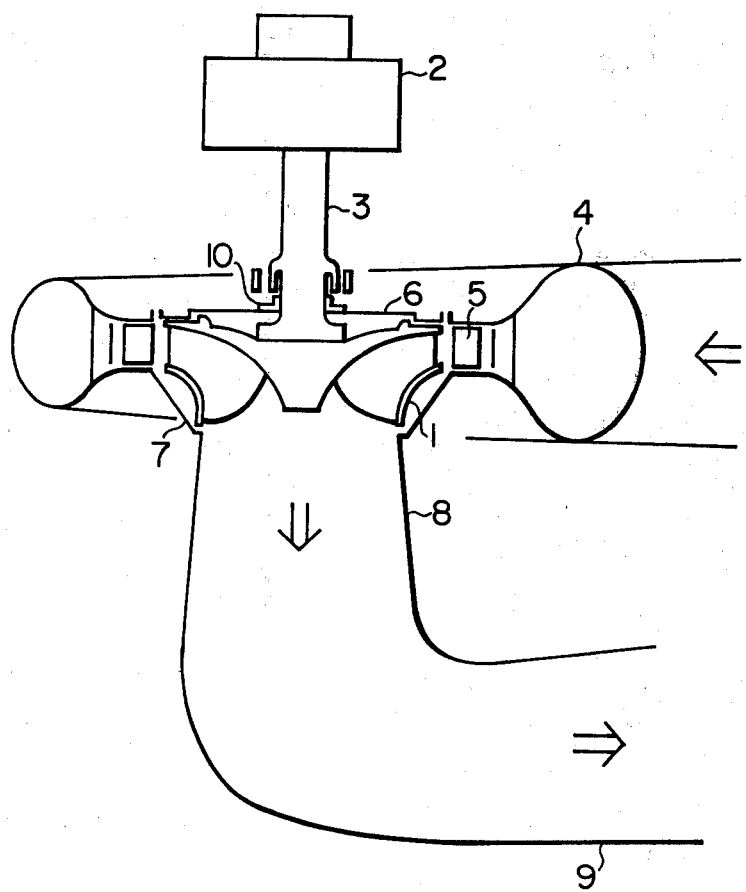
FIG. 1 is a longitudinal sectional view showing the hydraulic power plant in common use.
Figure 2:
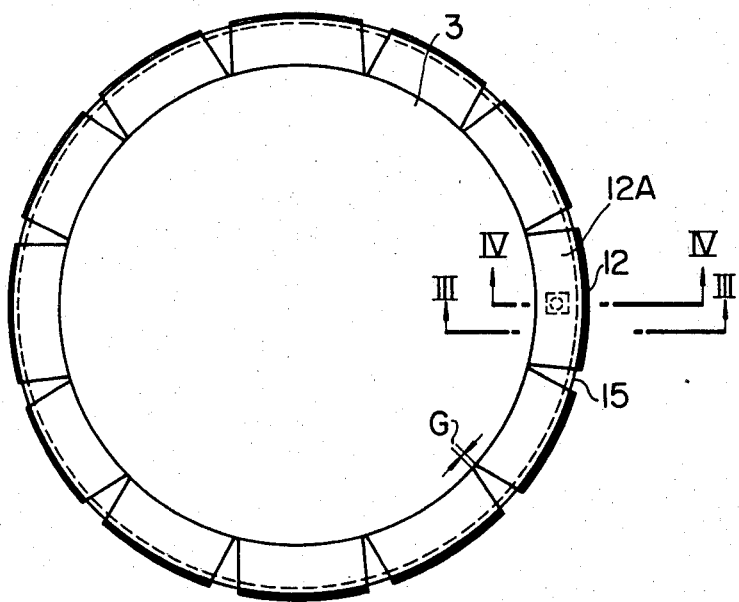
Figure 3:
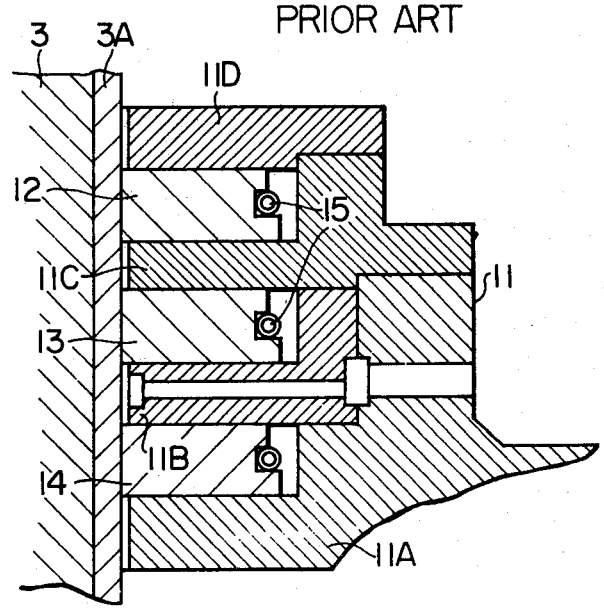
Figure 4:
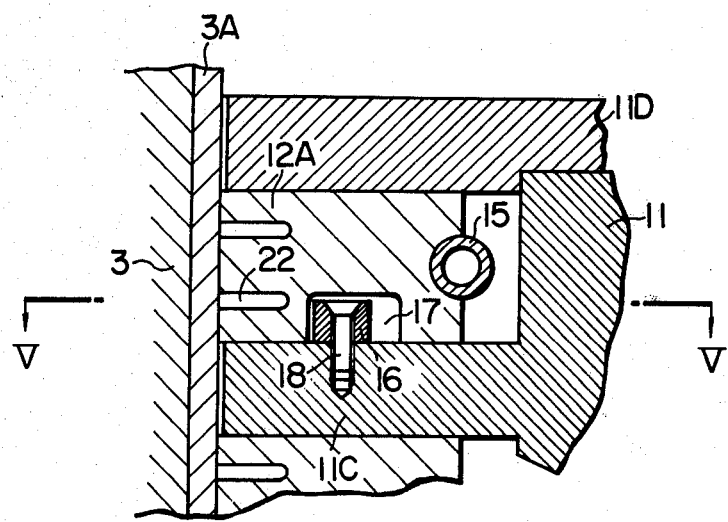
Figure 5:
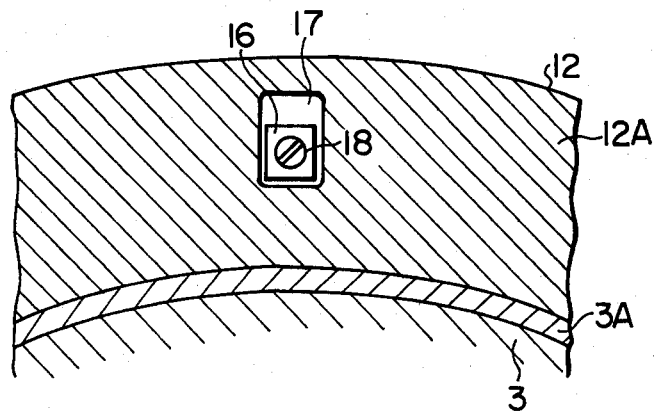
Figure 6:
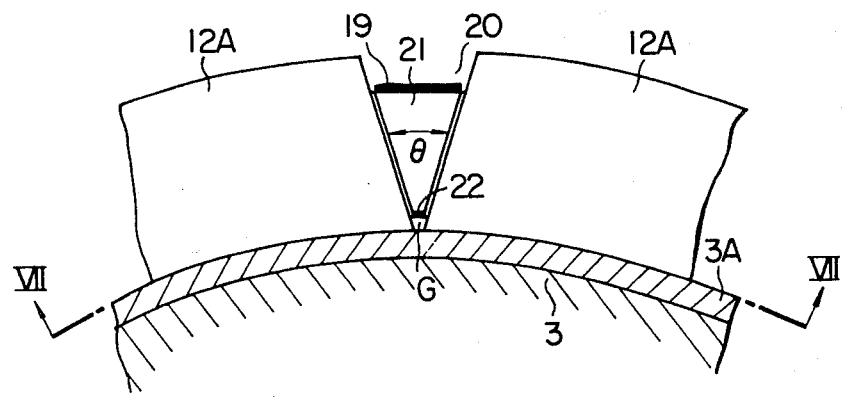
Figure 7:
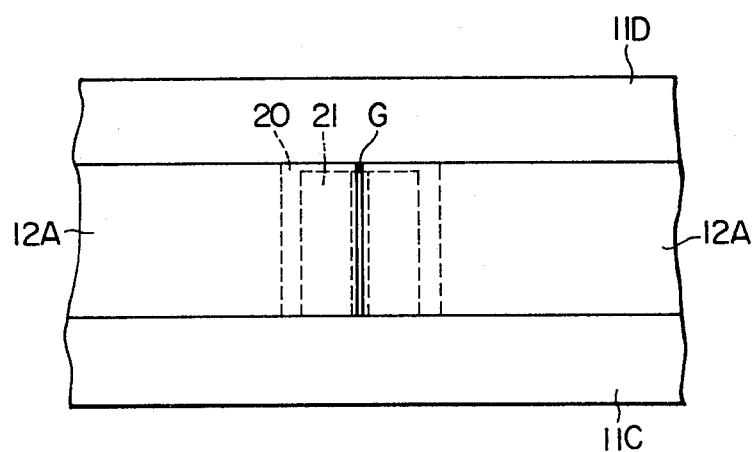

Description will hereunder be given of one embodiment of the present invention with reference to the drawings. FIGS. 6 and 7 show one embodiment of the rotary shaft water seal device according to the present invention, illustrating the portions of the adjacent packing segments abutted against each other, which constitute the essential portions of the embodiment.

In FIGS. 6 and 7, the abutting end portions of the adjacent segments 12A and 12A are inclinedly cut away in such a manner that the abutting end portions are progressively flared in the radially outward direction. A vacant space at these inclined end faces substantially forms a guide space 20. The portion of this space 20 in contact with the main shaft liner 3A is open and forms a gap G. A substantially wedge-shaped guide member 21 formed in a shape similar to this shape 20 is received in this space 20 in a manner to be rested on the support surface portion 11A of the packing box 11. The opposite inclined surface portions of this guide member 21 are abutted against the inclined surface portions of the space 20. The guide member 21, upon being accurately positioned by means of a gange or the like, is solidly secured to the support surface portion 11A through a welded portion 19 formed at a circular arcuate peripheral portion of the guide member 21 by a billet welding means or the like.

As described above, the guide member 21 is welded onto the support surface portion 11C, whereby little installation error thereof is developed. In consequence, the gap G can be minimized in dimensions, so that the flow rate of water leakage through the gaps G may be reduced.

Furthermore, the present embodiment can offer the following advantages in addition to the advantage of controlling the gap G in dimensions.

The surfaces of the guide member 21 and of the segments 12A, 12A, which are brought into sliding contact with one another, are inclined, whereby the segments 12A and 12A can be smoothly displaced in the radial direction. In passing, a tapered angle $\theta$ formed by the both inclined surfaces is indicated by $\theta = 360/n$, where n is the number of segments, i.e., the number of division of the packing. In addition, the length of the guide member 21 in the radial direction is smaller than the width of the semgent in the radial direction. The reason for this is to avoid that the side surfaces of the guide member 21 press against the spring 15 due to the worn segments 12A, whereby the spring 15 cannot apply the biasing force to the segments.

The guide member 21 fills up the space 20 formed at the outside of the gap G, whereby this guide member 21 functions as a fluid friction against the water leakage from the gap G to the space 20, so that the back pressure $P_0$ can be reduced.

Further, the guide member 21 is provided at the sides of the segments, whereby need for forming a guide groove in the segment can be eliminated, so that the segment itself can be increased in the mechanical strength. The segment, being improved in the mechanical strength, can be formed thin, so that the number of grooves 22 for cooling, which are formed on the inner peripheral surace of the packing can be reduced from two to one.

Furthermore, in the above-described embodiment, description has been given of one of the carbon packing 12, however, same is true of the other carbon packing 13 and the resin packing 14. Additionally, the present invention is applicable to solid packings other than the packing made of carbon and resin, and satisfactorily applicable as a rotary shaft water seal device for the hydraulic machine other than the hydraulic power plant.

Further, in the above-described embodiment, description has been given of the case where the guide members are welded, however, the guide members may be solidly secured by use of a bonding agent.

As has been described hereinabove, according to the present invention, the flow rate of water leakage through the gaps can be reduced.

What is claimed is:

1. A rotary shaft water seal device in a hydraulic machine, wherein a solid packing in which a plurality of circular arcuate segments are annularly arranged such that adjacent segments are spaced apart from each other through a slight gap is received in a packing box provided on the outer periphery of a rotary shaft with the inner peripheral surface of said packing being brought into sliding contact with the outer peripheral surface of said rotary shaft and guide members to guide the segments to be displaced in the radial direction of the axis of the segments are provided on the packing box, respectively, characterized in that each of said guide members is disposed in a space formed between the adjacent segments and outside said gap, being solidly secured to the packing box.

2. A rotary shaft water seal device in a hydraulic machine as set forth in claim 1, wherein said guide member, upon being accurately positioned, is welded at the peripheral portion of said guide member.

* * * * *